US012381355B2

(12) United States Patent
Giesbrecht

(10) Patent No.: US 12,381,355 B2
(45) Date of Patent: Aug. 5, 2025

(54) FASTENING SYSTEM FOR PLUG CONNECTOR

(71) Applicant: HARTING Electric Stiftung & Co. KG, Espelkamp (DE)

(72) Inventor: Peter Giesbrecht, Porta Westfalica (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 295 days.

(21) Appl. No.: 18/018,901

(22) PCT Filed: Sep. 20, 2021

(86) PCT No.: PCT/DE2021/100766
§ 371 (c)(1),
(2) Date: Jan. 31, 2023

(87) PCT Pub. No.: WO2022/068992
PCT Pub. Date: Apr. 7, 2022

(65) Prior Publication Data

US 2023/0291145 A1 Sep. 14, 2023

(30) Foreign Application Priority Data

Sep. 29, 2020 (DE) ..................... 10 2020 125 381.8

(51) Int. Cl.
*H01R 13/62* (2006.01)
*H01R 13/516* (2006.01)
*H01R 13/627* (2006.01)
*H01R 13/74* (2006.01)

(52) U.S. Cl.
CPC ....... *H01R 13/6275* (2013.01); *H01R 13/516* (2013.01); *H01R 13/745* (2013.01)

(58) Field of Classification Search
CPC ......................... H01R 13/6275; H01R 13/516; H01R 13/745; H01R 9/26; H01R 13/73; H01R 9/16
See application file for complete search history.

(56) References Cited

U.S. PATENT DOCUMENTS 5,382,179 A * 1/1995 Noschese ........... H01R 13/6275 439/369
5,480,310 A * 1/1996 Baum ................. H01R 9/2691 439/94

(Continued)

FOREIGN PATENT DOCUMENTS

DE 29920253 U1 2/2000
DE 102011001069 A1 9/2012

(Continued)

*Primary Examiner* — Truc T Nguyen
(74) *Attorney, Agent, or Firm* — Smartpat PLC

(57) ABSTRACT

The disclosure relates to a fastening system (1) for a plug connection (2). The fastening system (1) has a first holder element (3) for reversibly holding a first plug connector (5) and a second holder element (4) for reversibly holding a second plug connector (5'). The first and the second holder elements (3, 4) each have at least one latching arm (7, 7') via which the first and the second holder elements (3, 4) can be reversibly interlocked to each other. The disclosure also relates to a different mounting possibilities, in particular of such a fastening system (1).

8 Claims, 4 Drawing Sheets

(56) References Cited

U.S. PATENT DOCUMENTS

| | | | | | |
|---|---|---|---|---|---|
| 5,836,791 | A * | 11/1998 | Waas | H01R 4/2433 | 439/922 |
| 6,203,364 | B1 * | 3/2001 | Chupak | H01R 13/73 | 439/571 |
| 6,315,585 | B1 * | 11/2001 | Oka | H01R 13/62938 | 439/157 |
| 6,343,233 | B1 * | 1/2002 | Werner | A61N 1/3752 | 607/119 |
| 7,066,677 | B2 * | 6/2006 | Ruter | H01R 13/516 | 403/231 |
| 7,189,013 | B2 * | 3/2007 | Yang | G02B 6/4292 | 361/728 |
| 7,192,296 | B1 * | 3/2007 | Little | H01R 13/6275 | 439/358 |
| 7,717,723 | B2 * | 5/2010 | Nehm | H01R 13/62966 | 439/372 |
| 8,011,951 | B2 * | 9/2011 | Moore | H05K 5/0204 | 439/716 |
| 8,226,433 | B1 * | 7/2012 | Correll | H01R 9/2608 | 439/532 |
| 8,241,050 | B2 * | 8/2012 | Xu | G06F 1/1632 | 439/247 |
| 2003/0194887 | A1 * | 10/2003 | Minowa | H01R 9/2608 | 439/76.2 |
| 2007/0173136 | A1 * | 7/2007 | Bentler | H01R 9/2491 | 439/835 |
| 2008/0261426 | A1 * | 10/2008 | Diekmann | H01H 85/2045 | 439/189 |
| 2008/0293276 | A1 * | 11/2008 | Riner | H01R 25/164 | 439/215 |
| 2009/0117756 | A1 * | 5/2009 | Vianden | H01R 13/6275 | 439/65 |
| 2010/0093204 | A1 * | 4/2010 | Morello | H01R 13/6272 | 439/346 |
| 2010/0197154 | A1 * | 8/2010 | Suzuki | G01R 1/0416 | 439/122 |
| 2011/0053406 | A1 * | 3/2011 | Lin | H01R 4/4826 | 439/358 |
| 2012/0071038 | A1 * | 3/2012 | Ondusko | H01R 9/2675 | 439/884 |
| 2012/0244757 | A1 * | 9/2012 | Diessel | H01R 9/2608 | 439/709 |
| 2012/0252262 | A1 * | 10/2012 | Reibke | H01R 31/085 | 439/507 |
| 2012/0289086 | A1 * | 11/2012 | Jetton | H01H 85/0026 | 439/587 |
| 2014/0065881 | A1 * | 3/2014 | Vinay | H05K 1/141 | 439/620.2 |
| 2014/0113503 | A1 * | 4/2014 | Barber | H01R 9/26 | 439/712 |
| 2015/0255896 | A1 * | 9/2015 | Niemann | H01R 9/2625 | 439/121 |
| 2016/0149356 | A1 | 5/2016 | Schlegel | | |
| 2020/0161798 | A1 | 5/2020 | Lehmann | | |
| 2020/0378069 | A1 * | 12/2020 | Lienhard | E01B 9/30 | |
| 2022/0037813 | A1 | 2/2022 | Giesbrecht | | |

FOREIGN PATENT DOCUMENTS

| | | |
|---|---|---|
| DE | 102017203547 | 9/2018 |
| JP | H06223926 A | 8/1994 |
| WO | 2020114557 A1 | 6/2020 |

* cited by examiner

FASTENING SYSTEM FOR PLUG CONNECTOR

TECHNICAL FIELD

The disclosure relates to a fastening system for a plug connector. The disclosure furthermore relates to a method for mounting a fastening system. Fastening systems expand the field of application of plug connectors which are already commercially available. Thus, these plug connectors can be used in switch cabinets and/or in the internal wiring systems of machines.

BACKGROUND

WO 2020/114557 A1 discloses a housing for a plug connector, which can be attached to a top-hat rail and constructed with identically designed housing bodies to form a three-dimensional object.

However, specific installation requirements must be followed here. The position of the housing must be thought through and fixed before the plugging process, which limits the flexibility when installing appliances.

SUMMARY

An object of the disclosure consists in proposing a fastening system for a plug connection which can be used flexibly and produced cost-effectively. The object is achieved by the subject-matter of the independent claims. Advantageous embodiments of the invention are provided in the dependent claims and the following description.

The fastening system is provided for fastening a plug connection to a top-hat rail and/or an appliance wall. In this context, a plug connection is intended to be a plug connector which is plugged to an appropriate mating plug connector. The contact elements present in the plug connectors are here brought into contact with one another, which, depending on the type of contact element, enables the transmission of electrical currents and/or data signals, alternatively also pneumatic or fiber-optic signals. The contact elements are each accordingly designed so that they correspond with one another.

The fastening system consists of a first retaining element in which a first plug connector is reversibly retained, and a second retaining element in which a second plug connector is reversibly retained. The two retaining elements are in each case equipped with at least one latching arm, as a result of which they can be locked to each other reversibly. The plug connectors plugged to each other, i.e., in the plugged state, are also plugged to each other by the locking of the retaining elements.

The retaining elements preferably each have at least two opposite clamping arms between which the respective plug connector can be firmly clamped. Such clamping can be effected by simple technical means.

The retaining elements are preferably each formed essentially from a flat, essentially T-shaped piece from which the clamping arms protrude perpendicularly. Because the retaining element is preferably produced from plastic material, this basic shape can be achieved particularly simply in an appropriate injection-molding process.

In a preferred embodiment, the retaining elements each have at least two opposite latching arms. As a result, the retaining elements can be joined with an exact fit and the abovementioned latching is correspondingly more stable.

One retaining element preferably has a latching arm with a latching tab. The other retaining element has a latching arm with a matching latching hook. Such a latching connection, in particular in the case of plastic parts, is easy to implement, can be operated intuitively, and can be released easily.

In a particularly preferred embodiment, the first and the second retaining element each have a top-hat rail fixing means for reversible fixing to a top-hat rail. This top-hat rail fixing means can be provided as a further component and can be built or fixed, for example, to the T-shaped basic shape of the retaining element. As a result, the fastening system can be adapted flexibly for different applications.

The first and the second retaining element preferably each have a wall fixing means for reversible fixing to an appliance wall. This wall fixing means consists, for example, of openings which are introduced or formed in the T-shaped basic shape and are used, for example, for fastening with screws. As a result, no special tool is required for fixing to a wall. Clips, rivets, or similar wall fixing means can also usefully be used.

BRIEF DESCRIPTION OF THE DRAWINGS

An exemplary embodiment of the invention is illustrated in the drawings and explained in detail below.

DETAILED DESCRIPTION

The Figures contain partially simplified schematic illustrations. In part, identical reference signs are used for the same but possibly not identical elements. Different views of the same elements could be to a different scale.

Figure 1:
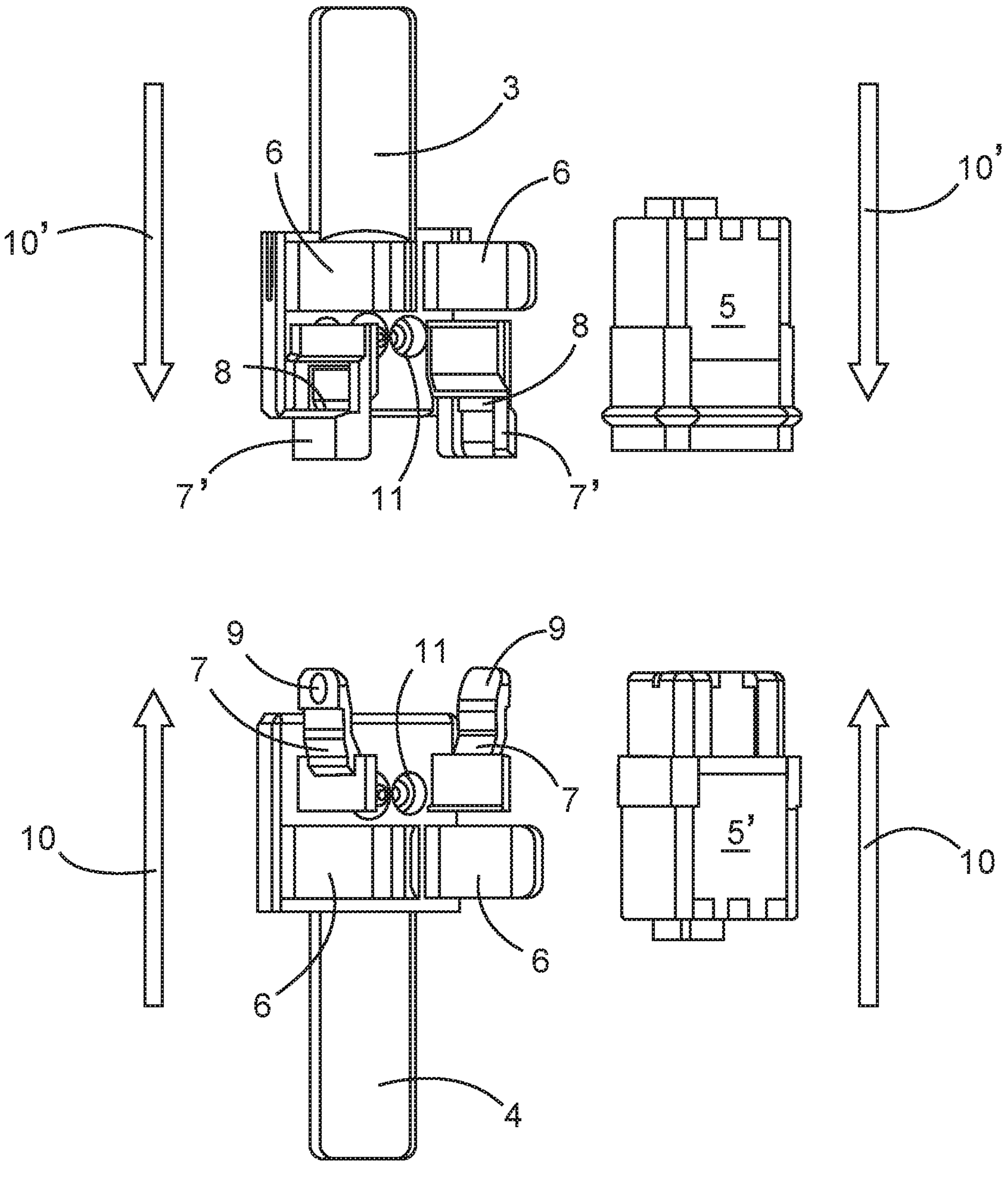
FIG. 1 shows a perspective illustration of a fastening system for a plug connection in the unplugged state.

FIG. 1 shows a fastening system 1 for a plug connection 2. The fastening system 1 consists of a first retaining element 3 for reversibly retaining a first plug connector 5 and of a second retaining element 4 for reversibly retaining a second plug connector 5'.

The retaining elements 3, 4 are essentially formed from a T-shaped basic shape, from which two opposite clamping arms 6 protrude perpendicularly. The plug connectors 5, 5' can each be firmly clamped reversibly between the clamping arms 6.

The retaining elements 3, 4 each have at least two opposite latching arms 7, 7'. The latching arms 7, 7' have an essentially T-shaped design, wherein the stem of the T protrudes perpendicularly from the basic shape of the retaining elements 3, 4.

The latching arms 7' of the first retaining element 3 have a latching tab 8. The latching arms 7 of the second retaining element 4 have a matching latching hook 9. The retaining elements 3, 4 are plugged together in the direction of the arrows 10, 10'. During the latching process, the latching hooks 9 first engage in the latching tabs 8 and are then latched, as a result of which the retaining elements 3, 4 are reversibly latched with each other.

Figure 2:
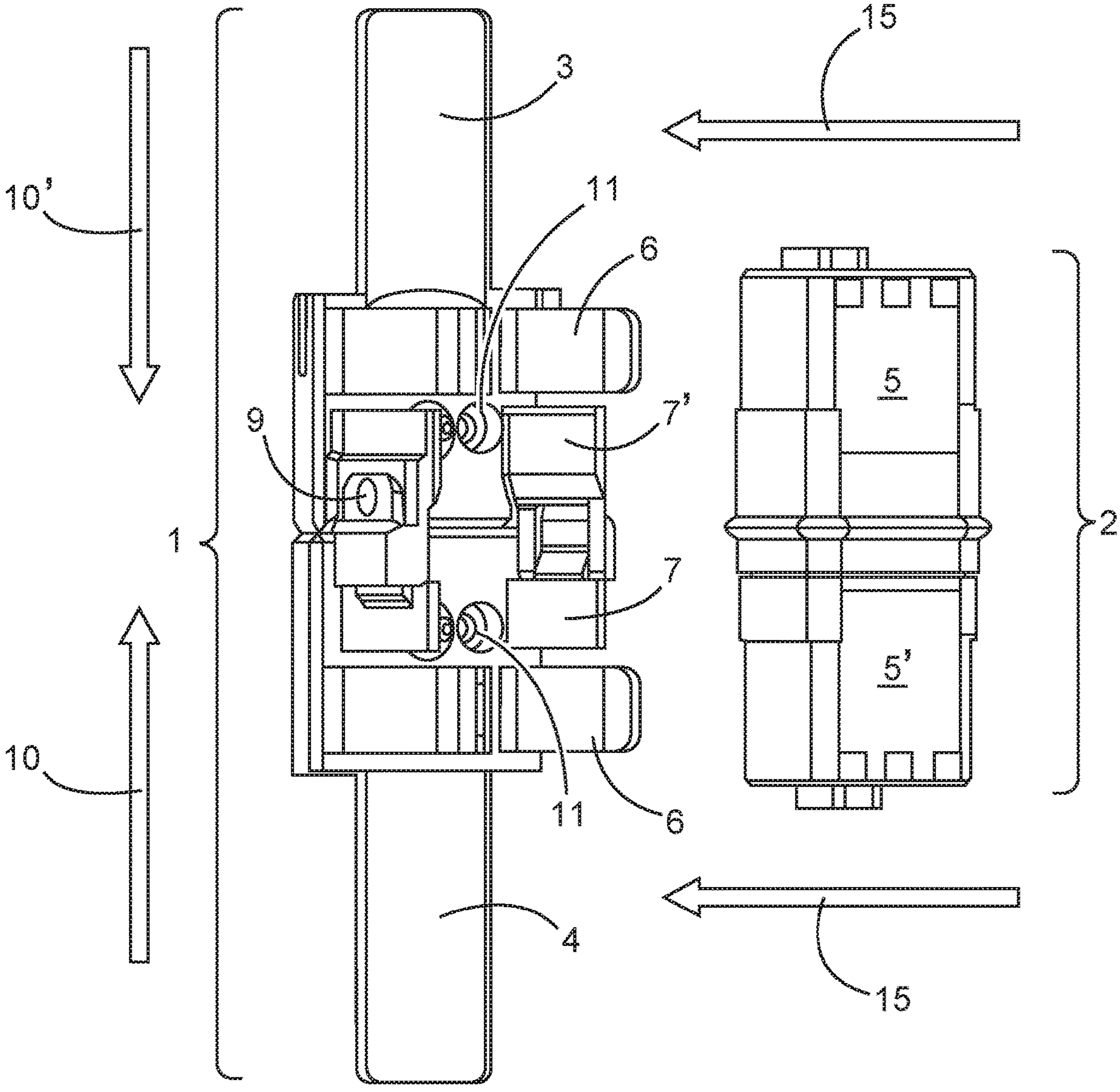
FIG. 2 shows a perspective illustration of a fastening system for a plug connection in the plugged state.
Figure 3:
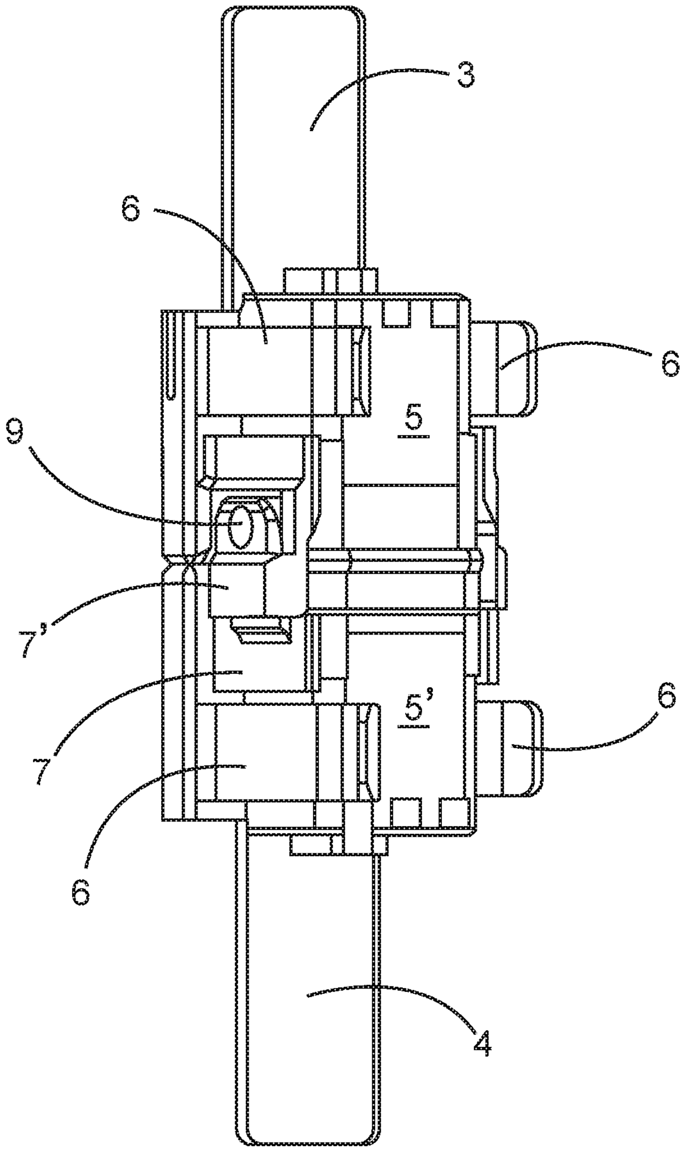
FIG. 3 shows a perspective illustration of a fastening system for a plug connection in the plugged state and with a plug connection retained therein.

The plug connectors 5, 5' are also plugged together in the direction of the arrows 10, 10' and, in the plugged state, form the plug connection 2 which can be seen, for example, in FIG. 2.

The retaining elements 3, 4 are provided in their basic shape with openings 11 via which the retaining means 3, 4 can be fastened—with the aid of screws, rivets, or similar fastening means—for example to an appliance wall (not shown).

Figure 4:
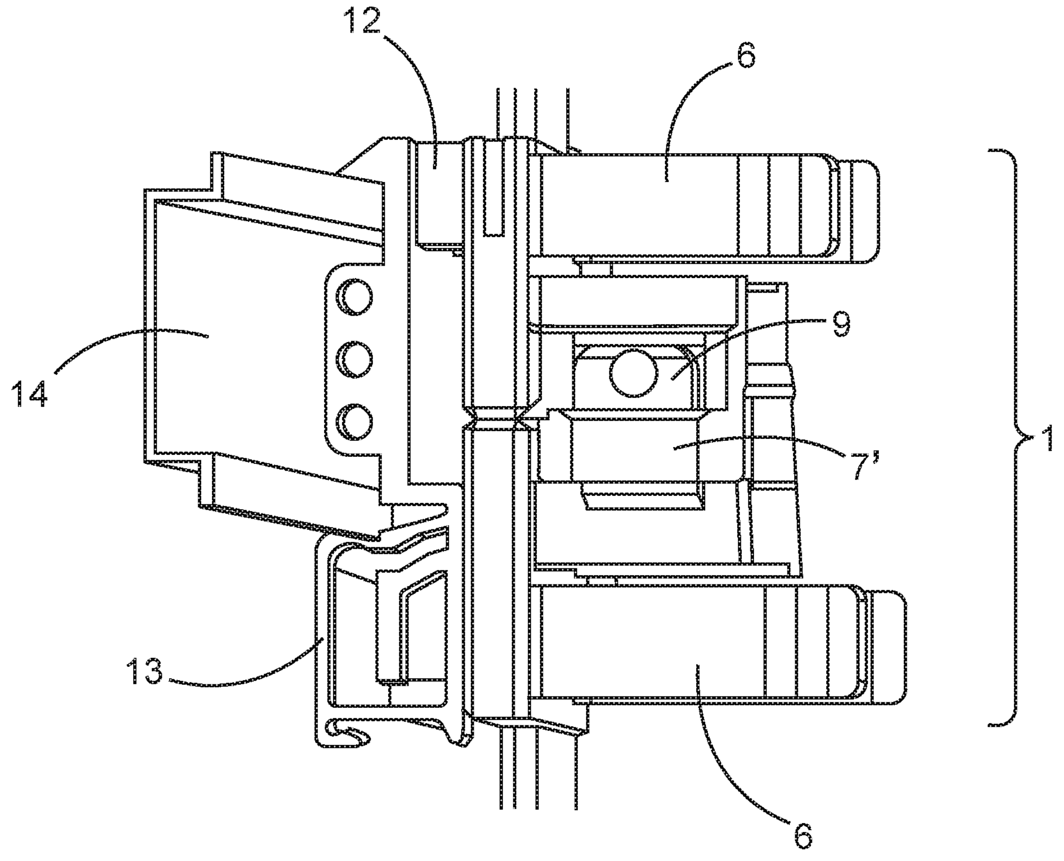
FIG. 4 shows a perspective illustration of a fastening system for a plug connection in the plugged state, which is fastened to a top-hat rail.

Two retaining means 3, 4 which are fixed to each other and are fastened to a separate top-hat rail fixing means 12 are shown in FIG. 4. The top-hat rail fixing means 12 is equipped with a top-hat rail clamping means 13 via which the whole fastening system 1 is fixed to a top-hat rail 14.

The plugging directions of the retaining elements 3, 4 and the plug connectors 5, 5' are represented by the arrows 10, 10'. The clamping direction in which the plug connectors 5, 5' or the plug connection 2 are firmly clamped to the retaining elements 3, 4 is represented by the arrow 15. The arrows 10, 10' and the arrow 15 are perpendicular to each other.

The retaining means 3, 4 offer various mounting options and accordingly can be used very flexibly.

A first mounting option takes place as follows:

a. A first retaining element 3 is first fastened to an appliance wall or on a top-hat rail 14.
b. A first plug connector 5 is then firmly clamped in the first retaining element 3 (arrow 15).
c. A second plug connector 5' is firmly clamped in a second retaining element 4 (arrow 15).
d. The second retaining element 4 is plugged together with the first retaining element 3, wherein the retaining elements 3, 4 are latched with each other (arrows 10, 10'). At the same time, the first plug connector 5 and the second plug connector 5' are plugged together with each other to form a plug connection 2.

An alternative, second mounting option is as follows:

a. A first retaining means 3 and a second retaining means 4 are first latched with each other (arrows 10, 10').
b. The retaining means 3, 4 latched with each other are fastened to an appliance wall (not shown) or on a top-hat rail 14.
c. A first plug connector 5 and a second plug connector 5' are plugged together to form a plug connection 2 (arrows 10, 10').
d. The plug connection 2 is then moved in the direction of the arrow 15 to the retaining means 3, 4 latched with each other and clamped thereto.

A third mounting option of the fastening system functions as follows:

a. A first plug connector 5 and a second plug connector 5' are first plugged together to form a plug connection 2 (arrows 10, 10').
b. A first retaining means 3 and second retaining means 4 are latched with each other (arrows 10, 10').
c. The retaining means 3, 4 latched with each other are fastened to an appliance wall (not shown) or on a top-hat rail 14.
d. The plugged-together plug connectors 5, 5' or the plug connection 2 resulting therefrom are/is firmly clamped into the retaining means 3, 4 latched with each other (arrow 15).

The method steps a and b can also be transposed.

Even if different aspects or features of the invention are shown in the Figures in each case in combination, unless otherwise stated it is clear to a person skilled in the art that the combinations illustrated and discussed are not the only ones possible. In particular, mutually corresponding units or groups of features from different exemplary embodiments can be transposed.

LIST OF REFERENCE SIGNS

1 fastening system
2 plug connection
3 first retaining element
4 second retaining element
5 plug connector
6 clamping arm
7 latching arm
8 latching tab
9 latching hook
10 arrow
11 opening
12 top-hat rail fixing means
13 top-hat rail clamping means
14 top-hat rail
15 arrow

The invention claimed is:

1. A fastening system (1) for fastening a plug connection (2) to an appliance wall or a top-hat rail (14), comprising:
a first retaining element (3) for retaining a first plug connector (5); and
a second retaining element (4) for retaining a second plug connector (5'),
wherein the first retaining element (3) and the second retaining element (4) each have at least one latching arm (7, 7') via which the first retaining element (3) and the second retaining element (4) can be locked to each other,
wherein the first retaining element (3) and the second retaining element (4) each have a top-hat rail mount (12, 13) for fixing to a top-hat rail (14), and
wherein the first retaining element (3) and the second retaining element (4) each have a wall mount for fixing to an appliance wall.

2. The fastening system (1) as claimed in claim 1,
wherein the first retaining element (3) and the second retaining element (4) each have at least two opposite clamping arms (6) between which the respective plug connector (5, 5') can be firmly clamped.

3. The fastening system (1) as claimed in claim 1,
wherein the first retaining element (3) and the second retaining element (4) each have at least two opposite latching arms (7, 7').

4. The fastening system (1) as claimed in claim 1,
wherein the first retaining element (3) has a latching arm (7') with a latching tab (8) and the second retaining element (4) has a latching arm (7) with a matching latching hook (9).

5. The fastening system (1) as claimed in claim 2,
wherein the first retaining element (3) and the second retaining element (4) are each formed essentially from a flat T-piece on which perpendicularly protruding clamping arms (6) are provided.

6. A system comprising the fastening system as claimed in claim 1 and a plug connection (2).

7. A method for mounting a fastening system (1) comprising the following sequence of steps:
fastening a first retaining element (3) to an appliance wall or on a top-hat rail (14);
firmly clamping a first plug connector (5) in the first retaining element (3);

firmly clamping a second plug connector (5') in a second retaining element (4); and plugging the second retaining element (4) together with the first retaining element (3), wherein the first retaining element (3) and the second retaining element (4) are latched with each other, and at the same time the first plug connector (5) and the second plug connector (5') are plugged together with each other to form a plug connection (2).

8. A method for mounting a fastening system (1) comprising the following sequence of steps:

latching a first retaining element (3) and a second retaining element (4) with each other;

fastening the first retaining element (3) and the second retaining element (4) while latched with each other to an appliance wall or on a top-hat rail (14);

plugging a first and a second plug connector (5, 5') together to form a plug connection (2); and firmly clamping the plug connection (2) into the first retaining element (3) and the second retaining element (4) latched with each other.

* * * * *